United States Patent [19]

Fleming

[11] Patent Number: 4,500,131
[45] Date of Patent: Feb. 19, 1985

[54] VISOR CONTROL

[75] Inventor: Dennis J. Fleming, Holland, Mich.

[73] Assignee: Prince Corporation, Holland, Mich.

[21] Appl. No.: 392,534

[22] Filed: Jun. 28, 1982

[51] Int. Cl.³ .......................... B60J 3/02; F16C 11/04
[52] U.S. Cl. ................................. 296/97 K; 248/293; 403/84; 403/97
[58] Field of Search ............... 296/97 R, 97 K, 97 H; 248/291, 293; 160/DIG. 3; 403/83, 84, 102, 119, 97, 165

[56] References Cited

U.S. PATENT DOCUMENTS 4,394,043 7/1983 Moulding et al. ................ 296/97 H

FOREIGN PATENT DOCUMENTS

| 3002124 | 7/1981 | Fed. Rep. of Germany ... | 296/97 H |
| 1452220 | 10/1976 | United Kingdom ............. | 296/97 H |
| 2034397 | 6/1980 | United Kingdom ............. | 296/97 K |

Primary Examiner—Robert B. Reeves
Assistant Examiner—Dennis H. Pedder
Attorney, Agent, or Firm—Price, Heneveld, Huizenga & Cooper

[57] ABSTRACT

A visor control having an elongated elastically deformable clamp of U-shaped cross-section with sides contacting a cylindrical pivot rod to hold the visor in position. The pivot rod has noncontinuous flats broken by lobes which align with recesses formed in the sides of the clamp. The sides of the clamp engage the edges of the flats as the rod is rotated within the clamp to provide a torque on the pivot rod as the sides abut the edge of the flats to provide snap-up action to move and hold the visor in a stored position. In a preferred embodiment of the invention, the rod includes a plurality of alternately staggered flats and lobes with the lobes positioned to selectively align with recesses in the sides of the clamp.

12 Claims, 11 Drawing Figures

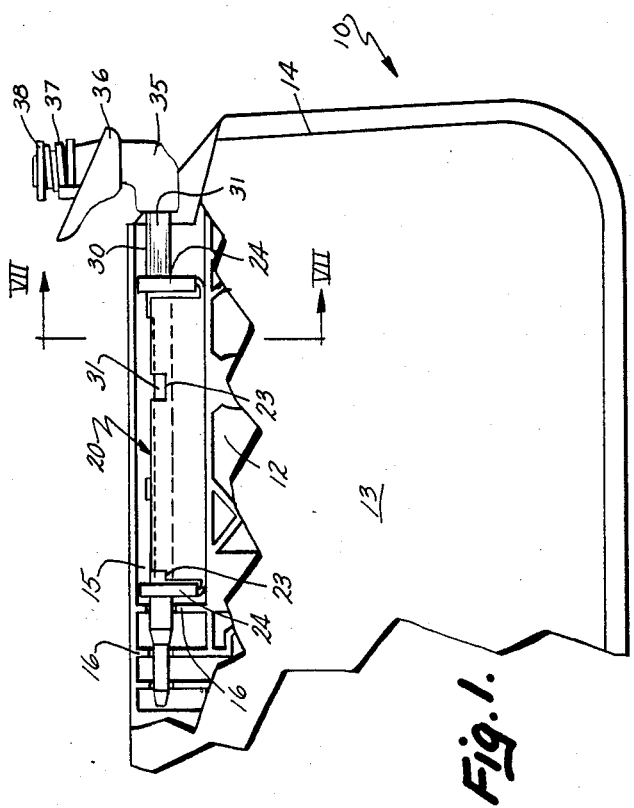
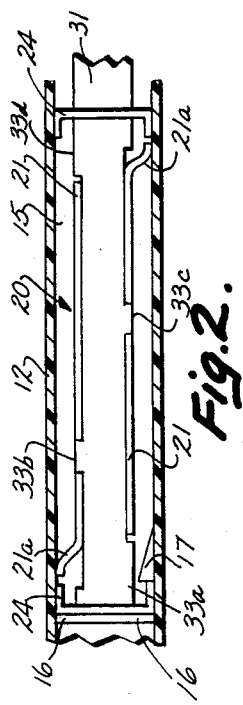
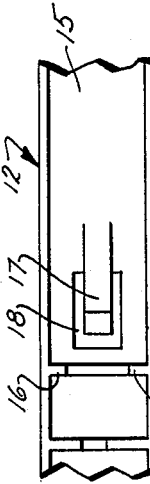
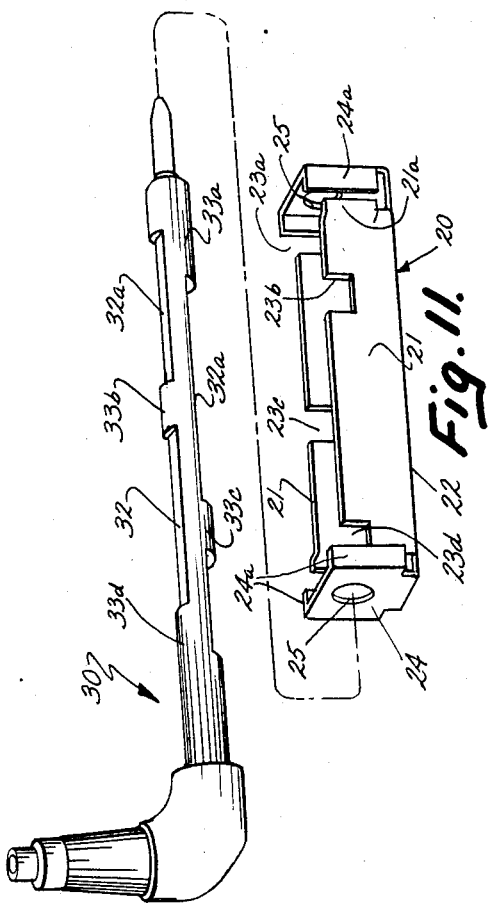
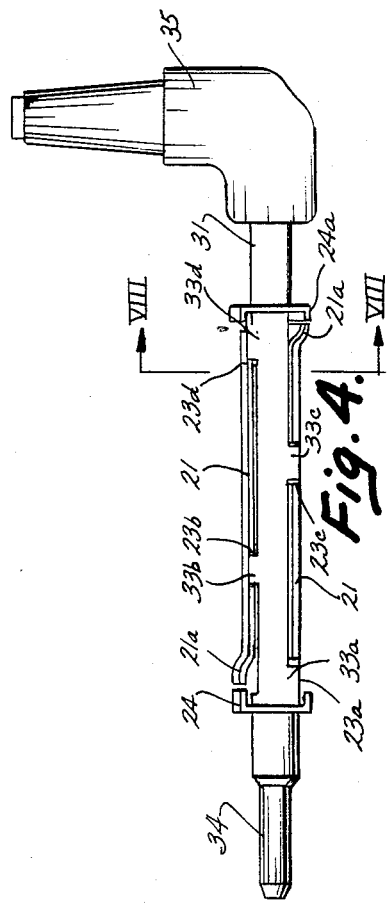

VISOR CONTROL

BACKGROUND OF THE INVENTION

The present invention relates to a visor assembly and particularly to a control for releasably locking a visor in a stored position.

Visor assemblies for use in vehicles such as automobiles, typically use a friction mechanism between the pivot rod and the visor body to allow the visor to be adjusted to a desired rotational position about the visor rod and be held in that position. The friction mechanism must, however, permit relatively easy adjustment of the visor and yet hold the visor in a desired position. With such frictional devices, as the vehicle travels along the highway, the visor can slip down from the stored position and not only become somewhat unsightly, but if lowered sufficiently, can project horizontally and present a safety hazard to the passengers within the vehicle in the event of an accident.

Some visors, such as European-type visors, have a wire rod frame and are filled with foam material. Such visor construction is disclosed, for example, in U.S. Pat. No. 4,070,054 and employs a lightweight clip which encircles the pivot rod and which selectively engages flats on either side of this pivot rod to hold the visor in a predetermined position. An improved visor control is disclosed in a commonly assigned patent application, Ser. No. 273,644, filed on June 15, 1981 and entitled VISOR CONTROL, of which I am co-inventor. This visor control is somewhat expensive and requires an assembly tool to spread the spring arms for mounting the visor on the pivot rod and cannot be hand assembled as can the control of the present invention.

SUMMARY OF THE INVENTION

The visor control of the preferred embodiment of the present invention provides a snap-up visor control action which releasably locks the visor in a stored position, yet frictionally and securely holds the visor in any desired lowered position for use. As the visor is moved toward the stored position, the control will effectively snap the visor up against the headliner of a vehicle. The visor control permits easy assembly and the pivot rod and clamp unit can be assembled, pre-tested and the combination then slid and snap locked into the visor body.

The visor control of the present invention includes a generally U-shaped resilient clamp having a base and a pair of legs extending from opposite edges thereof for compressibly interengaging a pivot rod to provide the desired control thereto. The pivot rod is formed including alternately staggered lobes and flats disposed along its longitudinal axis in spaced relationship to cooperate with recesses formed in the legs of the clamp such that at least one visor locking position is provided. In one embodiment of the invention, retaining means are provided for receiving and holding said pivot rod between the clamp legs.

The present invention thus provides a compact and strong clamp which releasably locks the visor in a stored position and yet allows for the frictional holding of the visor in any desired position of use. Another feature of the present invention is that the visor control can be easily manufactured and assembled since the pivot rod and resilient clamp each comprise a single piece not requiring individual assembly, and the clamp can be assembled on the pivot rod for testing prior to insertion in the visor body.

These and other features, objects and advantages of the present invention will become apparent upon reading the following description thereof together with reference to the drawings in which:

BRIEF DESCRIPTION OF THE DRAWINGS

FIG. 1 is a fragmentary, front elevational view of a visor embodying the present invention in a lowered sunshade position and shown partly broken away;

FIG. 2 is an enlarged, fragmentary, rear elevational view of the clamp and a portion of the visor body shown in a stored position;

FIG. 3 is an enlarged, rear, fragmentary, elevational view of the tang portion of the visor body in the lowered sunshade position of FIG. 1;

FIG. 4 is an enlarged, front, elevational view of the clamp with the pivot rod subassembly shown in a locked storage position of FIG. 2;

FIG. 11 is a perspective, exploded view of the pivot rod and clamp of the present invention with the clamp in a lowered sunshade position.

DETAILED DESCRIPTION OF THE PREFERRED EMBODIMENT

Figure 5:
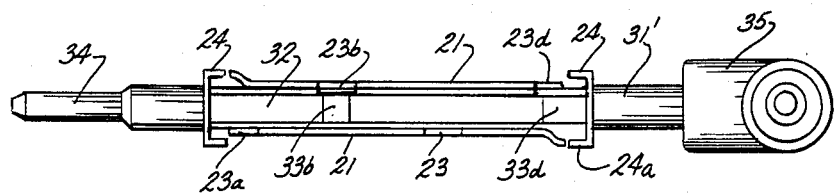
FIG. 5 is a side, elevational view of the clamp, with the pivot rod subassembly pivoted so that the clamp is in a lowered sunshade position, with the cylindrical body of the pivot rod separating the contacting sides of the clamp.

Referring initially to FIG. 1, there is shown a visor 10 incorporating a visor position control of the present invention. The visor is shown in a lowered sunshading position with the visor position control including a pivot rod 30 and spring clamp 20. One end of rod 30 is press fit to elbow 35 to remain stationary with respect to the elbow. The other end of elbow 35 is pivotally coupled to an aperture in a mounting flange 36, which in turn is secured to a vehicle headliner by appropriate mounting screws. The elbow 35 and mounting flange 36 are secured to one another by a conventional compression spring 37 and washer 38 to provide a frictional pivot therebetween for moving the visor from the windshield area of the vehicle to a side window, if desired.

Visor 10 includes a U-shaped, resilient clamp 20 fitted within the visor body and extending along the top edge. Resilient clamp 20 accommodates pivot rod 30 and controllably positions the visor. Visor 10 is formed of a molded polymeric body or core 12 and covered by a padded upholstery material 13, which in turn is surrounded along the peripheral edges, as seen in FIG. 1, by a suitable bead 14 to provide a finished appearance to the visor construction. The visor body 12 is molded to include a tubular opening 15 along the top edge for receiving clamp 20 and rod 30, as seen in FIG. 1.

Figure 7:
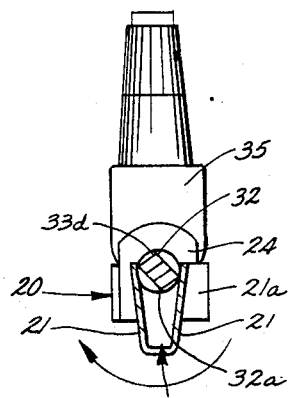
FIG. 7 is a cross-sectional view of the pivot rod and clamp assembly of FIG. 1 taken along line VII—VII.
Figure 8:
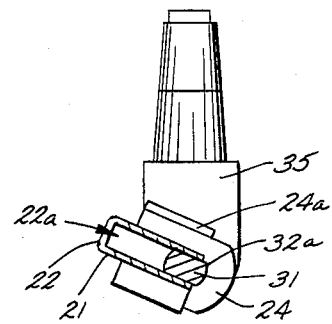
FIG. 8 is a cross-end sectional view of the pivot rod and clamp assembly of FIG. 4 taken along line VIII—VIII.
Figure 9:
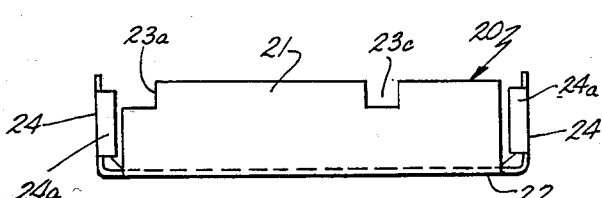
FIG. 9 is a front, elevational view of the resilient clamp of the present invention in a lowered sunshade position.

The visor control of the present invention comprises a resilient clamp 20 (FIGS. 9 and 11) for releasably and lockably positioning a visor in a storage position up against the vehicle headliner and also holding the visor in desired lowered positions of use. Clamp 20 has a generally U-shaped cross-section, as seen in FIGS. 7, 8 and 11, formed by two rod contacting sides or legs 21 joined by base 22. Clamp 20 is cut from a sheet of S.A.E. 1074 spring steel having a thickness of from 0.039 to 0.045 inches and about 0.0418 inches, in the preferred embodiment, and bent to the desired shape. Preferably, the contacting sides 21 are 2.5 inches long and 0.6 inches high.

Figure 10:
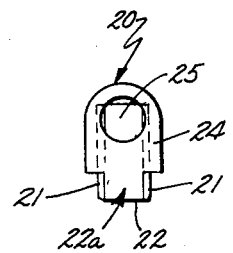
FIG. 10 is an end, elevational view of the resilient clamp of the present invention in a lowered sunshade position.

In order to hold clamp 20 on rod 30, an integral end wall 24 is bent up from the base 22 on either end of the clamp 20, leaving each end wall 24 spaced a slight distance from contacting sides 21. Each end wall 24, as seen in FIGS. 10 and 11, is U-shaped having a width approximately equal to the width of base 22 at the point where it joins base 22 and then a greater width, preferably 0.5 inches, a short distance above this point. Apertures 25, which are preferably 0.320 inches in diameter, are located at the top of each end wall 24. The sides of each end wall 24 are bent inwardly to form tabs 24a which extend 0.125 inches perpendicular to end wall 24 towards the body of the clamp. A gusset 22a is formed into the joint between base 22 and each end wall 24 to add stiffness to the junction of end walls 24 with base 22.

As seen in FIGS. 4, 5, 6, 9 and 11, each contacting side 21 of clamp 20 has two rectangular recesses or gaps 23 formed downwardly from the free edge of the contacting side opposite the base. The recesses 23 are alternatingly staggered so that no recess 23 is directly opposite another recess 23 on the other contacting side 21. Recess 23a is located on one contacting side 21 adjacent an end wall 24. Recess 23d is located on the other contacting side adjacent the other end wall 24. Recess 23b is located on the same contacting side as recess 23d, and recess 23c on the same contacting side as recess 23a, with recesses 23b and 23c being spaced along the length of clamp 20 in alternatingly staggered relationship, as shown in FIG. 11. The end of each contacting side 21 which does not have a recess 23a or 23d therein has an outward bend 21a (FIGS. 2, 4 and 11) which terminates adjacent the edge of tab 24a on end wall 24. Therefore, if pressure is applied to end wall 24 during installation, forcing it towards the body of clamp 20, tab 24a will contact outward bend 21a preventing end wall 24a from further bending and possibly fracturing.

To reduce the chance of failure due to repeated use of the clamp, a metal filet can be welded between each contacting side 21 and base 22 on the inside of clamp 20, if necessary. The resilient clamp 20 is heat treated and tempered to a Rockwell C scale hardness of 45 and, subsequently, shot peened to remove burrs and surface stresses.

Visor body 12 is molded to receive clamp 20 having a tubular opening 15 with a cross-section corresponding generally to the shape of end wall 24 allowing the clamp 20 and pivot rod 30 to be slid into and contained by visor body 12. Flanges 16 extend internally within visor body 12 to abut an end wall 24 and longitudinally position clamp 20 within visor body 12. On one side of tubular opening 15 is resilient tapered tang 17 which protrudes into opening 15. A U-shaped hole 18 is molded in visor body 12 and surrounds the end of tang 17, as shown in FIG. 3, allowing tang 17 to be resiliently deflected out of tubular opening 15. The side of tang 17 protruding into tubular opening 15 is angled so that as clamp 20 is slid into tubular opening 15, the inward end wall 24 deflects tang 17 outwardly. When end wall 24 passes tang 17, tang 17 resiliently snaps back to its non-deflected position and abuts end wall 24, as shown in FIG. 2, thereby locking clamp 20 within the visor body 12.

Pivot rod 30 has two flats 32 ground into the solid cylindrical body 31. Flats 32 are spaced 180° apart from each other and are segmented or noncontinuous, being broken by a section of the pivot rod that has not been flattened, so as to form a lobe 33 between each flat segment 32. These lobes are alternately staggered so that the two lobes 33b and 33c are not directly opposite each other on the pivot rod. Additional end lobes 33 are created by extending one flat further down the pivot rod body 31 toward the elbow 35, creating a lobe 33d on the opposite side of the pivot rod body 31, and extending the other flat further down the pivot body rod toward the free end to form a lobe 33a on the opposite flat. All of the lobes are spaced along the longitudinal axis of the pivot rod so that no lobe is diametrically opposite a lobe on the other flat. The stagger of the lobes 33 corresponds to the alternating stagger of recesses 23 on the contacting sides of clamp 20. Therefore, each lobe 33 has one recess 23 with which it mates when the visor 10 is in a stored position, shown in FIG. 4, with lobe 33a only mating with recess 23a, lobe 33b with recess 23b, et cetra. Since there is no recess 23 directly opposite any recess on the other contacting side 21, it is only when visor 10 is in a stored position that the lobes 33 mate with recesses 23. The free end of the pivot rod 30 terminates in a taper and reduced diameter section 34 to facilitate insertion of the rod in clamp 20.

Flats 32 are oriented on pivot rod body 31 to form an angle with relation to elbow 35, as shown in FIG. 7, 8. The angle formed by flats 32 and elbow 35 is selected for a particular vehicle and in one embodiment, was 63°, so that when the visor is in the stored position, clamp 20 will be oriented above the horizontal, as shown in FIG. 8. Since clamp 20 is stored at an angle above the horizontal, a visor 10 carried thereon will be pressed up and held against the headliner while in the stored position with the sides 21 of clamp 20 compressibly engaging flats 32 of rod 30 to releasably lock the visor in the stored position.

To assemble the visor control, pivot rod 30 is slid into clamp 20 by passing end 34 through aperture 25 in one end 24 of the clamp, through contacting sides 21 and then, through aperture 25 in the other end wall. Since end 34 has a reduced diameter, it passes between contacting sides 21, and even though the diameter of pivot rod 30 is larger than the gap between contacting sides 21, pivot rod 30 can be slid axially through clamp 20 while pivoting the clamp back-and-forth slightly. The clamp 20 and pivot rod 30 assembly can then be tested for proper operation before sliding the assembly into tubular opening 15 in visor body 12 until the leading end wall 24 abuts flanges 16, and tang 17 snaps into a clamp locking position.

Figure 6:
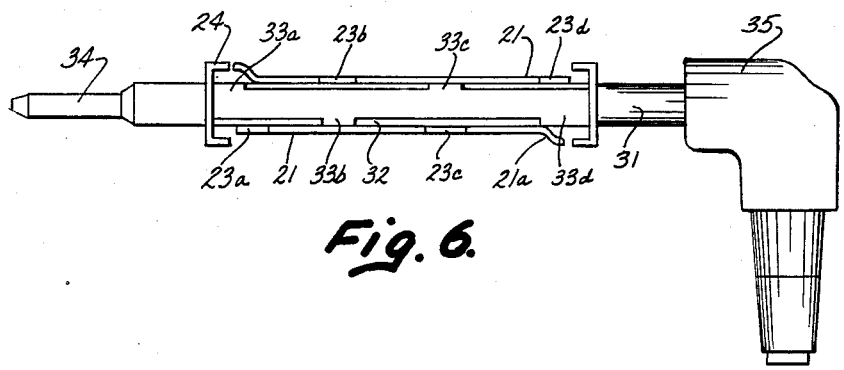
FIG. 6 is a side, elevational view of the clamp, with the pivot rod subassembly rotated to a position 180° from the storage position, with the lobes of the pivot rod separating the contacting sides of the clamp.

While in the stored position, contact sides 21 are elastically separated slightly while in contact with flats 32. Lobes 33 fit into recesses 23, allowing direct contact between contacting sides 21 and flats 32, shown in FIGS. 4 and 8. When the visor is lowered into a position of use, contacting sides 21 are initially resiliently separated by the camming action of a linearly extending edge 32a (FIGS. 7, 11) of flates 32 and lobes 33 on one side of pivot rod 30. Thereafter, contact sides 21 are resiliently separated or cammed outward by the circumference of pivot rod 30 and thereby frictionally hold clamp 20 and visor 10 in any desired, adjusted position, as shown, for example, in FIG. 7. When visor 10 is rotated 180° from the stored position, lobes 33 abut contacting sides 21 and cam or keep sides 21 in a stressed position out of contact with flats 32 (FIG. 6).

As the visor 10 is rotated upwardly or clockwise from a position of use, as indicated by arrow A in FIG. 7, the linearly extending edge 32a of flattened surface 32 engages contacting sides 21 creating a rotational torque tending to raise clamp 20 and thus, snap visor 10 into an equilibrium storage position, shown in FIG. 8, with contacting sides 21 abutting flats 32. The point at which the visor control assembly moves the visor or snaps it up to the start position, shown in FIG. 5, is approximately 30° below the storage position as the visor is manually moved toward the headliner. In the preferred embodiment of the invention, the torque provided by the visor control in automatically moving the visor approximately 10 inch-pounds, in one embodiment. Thus, the control means of the preferred embodiment of the invention provides a secure stored position for the visor, and when the visor is in a lowered position, frictionally holds that position preventing inadvertent movement of the visor once adjusted to a desired position. Once pivoted downwardly from the headliner, the visor can be adjusted to any normal sun-blocking position, and yet, will be returned and securely held in the stored position.

Thus, clamp 20 is a lightweight and easily manufactured single piece which provides for easy assembly and testing prior to insertion in visor 10. The length of clamp 20 and rod 30 can be varied to vary the torque between these elements.

It will become apparent to those skilled in the art that various modifications to the preferred embodiment of the invention disclosed herein can be made without departing from the spirit or scope of the invention as defined by the appended claims. Such changes may, for example, encompass the use of an increased number of lobes and recesses, a different number or position of end walls, or changing the thickness or size, and therefore, the torque of the resilient clamp.

The embodiments of the invention in which an exclusive property or privilege is claimed are defined as follows:

1. A visor control for a vehicle mounted visor for releasably locking the visor in a predetermined position and holding the visor in other selectable positions, comprising:
a visor including a pivot rod extending therein for pivotally mounting the visor to a vehicle for adjustable movement between a raised, stored position and lowered sun shading positions, said pivot rod being generally cylindrical with a non-flat side, a longitudinal axis and having formed on a surface thereof, aligned, longitudinally spaced flats defining at least one lobe therebetween; and
an elastically deformable elongated U-shaped clamp adapted to fit within said visor and receive said pivot rod, said clamp having integral sides compressibly engaging said pivot rod, wherein at least one of said sides includes a recess aligned with said lobe of said pivot rod when said rod is in a predetermined rotational position with respect to said clamp such that said side engages said flats to elastically lock said pivot rod and visor in a stored position, and when said visor is pivoted, said sides are elastically separated by the camming action of said non-flat side of said generally cylindrical pivot rod and said lobe to frictionally hold the pivot rod and visor in position.

2. A visor control for a vehicle mounted visor for releasably locking the visor in a predetermined position and holding the visor in other selectable positions, comprising:
a visor pivot rod for pivotally mounting a visor to a vehicle for adjustable movement between a raised, stored position and lowered sun shading position, said pivot rod being generally cylindrical with a non-flat side, a longitudinal axis and having formed on a surface thereof, a first noncontinuous longitudinally extending flat broken by at least one lobe, said pivot rod having formed in said surface opposite said first flat a second noncontinuous longitudinally extending flat broken by at least one lobe wherein the lobes on said pivot rod are alternately staggered in a longitudinal direction; and
an elastically deformable elongated clamp adapted to fit within a visor and receive said pivot rod, said clamp having two spaced sides for compressibly engaging said pivot rod, said clamp having recesses formed in said sides and aligned with said lobes of said pivot rod when said rod is in a predetermined rotational position with respect to said clamp such that said sides engage said flats and said clamp elastically locks said pivot rod and visor in a predetermined position, and when the visor is pivoted from said predetermined position, said sides are elastically separated by said non-flat side of said generally cylindrical pivot rod and said lobes to frictionally hold the pivot rod and visor in position.

3. The apparatus as defined in claim 2 wherein said clamp includes means for retaining said pivot rod in alignment with said clamp.

4. The apparatus as defined in claim 3 wherein said clamp has a generally U-shaped cross-section with a base and wherein said sides integrally extend from opposite edges of said base.

5. The apparatus as defined in claim 4 wherein said retaining means comprises wall means extending from said base and having an aperture therein for receiving and positioning said pivot rod in alignment with said sides.

6. A visor control for a vehicle mounted visor for providing snap-up operation of the visor for storage comprising:
a visor including a pivot rod extending therein for pivotally mounting the visor to a vehicle for adjustable movement, said pivot rod having a longitudinal axis and having a first longitudinally extending, noncontinuous flat broken by at least one lobe, said pivot rod having a second noncontinuous flat broken by at least one lobe on a side opposite said first flat, the lobe associated with said second flat being spaced along the longitudinal axis of said pivot rod so as to not be dimetrically opposite any lobe associated with said first flat;
an elongated, elastically deformable clamp attached to said visor and having two spaced sides for compressibly engaging said pivot rod therebetween, said sides having recesses formed therein in spaced relationship and positioned to align and seat said lobes therein when the visor is in a stored position and wherein said flats cooperate with said sides to provide a torque to said visor body as it is moved to a stored position to assist in moving the visor toward the stored position and releasably hold the visor in the stored position.

7. The apparatus as defined in claim 6 wherein said clamp has a generally U-shaped cross-section and said sides extend integrally from opposite edges of a base.

8. A visor control including a spring clamp for mounting to a visor and for receiving a visor pivot rod for providing a visor holding force, said control comprising:

a clamp having a generally U-shaped cross section formed by a base and first and second integral resilient legs extending from opposite edges of said base and spaced a distance from one another to apply a compressive force to the visor pivot rod positioned therebetween; and said clamp including retaining means comprising a first and a second wall extending from opposite ends of said base, each wall including an aperture therein for receiving a pivot rod, wherein said rod includes flats engaging said legs for releasably locking said rod in a predetermined rotational position with respect to said clamp corresponding to the stored position, and wherein said clamp includes alternately staggered recesses formed in said legs for mating with alternately staggered lobes formed by flats on said rod, said clamp and rod cooperating to urge and releasably hold the visor in a raised stored position.

9. A visor control for a vehicle mounted visor for releasably locking the visor in a predetermined position and holding the visor in other selectable positions, comprising:

a visor pivot rod for extending in a visor for pivotally mounting the visor to a vehicle for adjustable movement between a raised, stored position and a lowered sun shading position, said pivot rod being generally cylindrical with a longitudinal axis having cam means formed on a surface thereof;

an elastically deformable elongated U-shaped clamp adapted to fit within a visor and receive said pivot rod, said clamp having a base with integral sides extending from opposite edges of said base and terminating in spaced relationship from each other to define a U-shaped clamp open along a longitudinally extending side, said sides spaced to compressibly engage said pivot rod, wherein at least one of said sides includes cam following means cooperating with said cam means to elastically lock said pivot rod and visor in a stored position, and when said visor is pivoted, elastically separate said sides to frictionally hold the pivot rod and visor in position; and said cam means including alternately staggered lobes and flats formed in said pivot rod and said cam following means including recesses formed in said legs for alignment with said lobes.

10. A visor control including a spring clamp for mounting to a visor and for receiving a visor pivot rod for providing a visor holding force, said control comprising:

an elongated U-shaped clamp formed by a base and first and second integral resilient legs extending from opposite edges of said base and spaced a distance from one another to apply a compressive force to a visor pivot rod positioned therebetween, said clamp including spaced recesses cooperating with alternately staggered lobes and flats on a pivot rod to urge and releasably hold the visor in a raised stored position.

11. The visor control as defined in claim 10 and further including retaining means extending from said base and including an aperture therein for receiving and securing a pivot rod in alignment between said legs.

12. A visor control for a vehicle mounted visor for releasably locking the visor in a predetermined position and holding the visor in other selectable positions, comprising:

a visor including a pivot rod extending therein for pivotally mounting the visor to a vehicle for adjustable movement between a raised, stored position and lowered sun shading positions, said pivot rod being generally cylindrical with a non-flat side, a longitudinal axis and having formed on a surface thereof at least one flat defining at least one lobe longitudinally adjacent said flat; and an elastically deformable elongated U-shaped clamp adapted to fit within said visor and receive said pivot rod, said clamp having integral sides compressibly engaging said pivot rod, wherein at least one of said sides includes at least one recess aligned with said lobe of said pivot rod when said rod is in a predetermined rotational position with respect to said clamp such that said side engages said flat to elastically lock said pivot rod and visor in a stored position, and when said visor is pivoted, said sides are elastically separated by the camming action of said non-flat side of said generally cylindrical pivot rod and said lobe to frictionally hold the pivot rod and visor in position.

* * * * *

UNITED STATES PATENT AND TRADEMARK OFFICE
CERTIFICATE OF CORRECTION

PATENT NO. : 4,500,131

DATED : February 19, 1985

INVENTOR(S) : Dennis J. Fleming

It is certified that error appears in the above-identified patent and that said Letters Patent is hereby corrected as shown below:

Column 5, line 25:
　　After "visor" insert --is--

Column 6, line 65:
　　"dimetrically" should be --diametrically--

Signed and Sealed this

Twenty-seventh Day of August 1985

[SEAL]

Attest:

DONALD J. QUIGG

Attesting Officer　　Acting Commissioner of Patents and Trademarks